United States Patent [19]
Eichbauer

[11] Patent Number: 5,907,942
[45] Date of Patent: Jun. 1, 1999

[54] STRETCH WRAP FILMS

[75] Inventor: George N. Eichbauer, Conyers, Ga.

[73] Assignee: Tenneco Packaging, Evanston, Ill.

[ * ] Notice: This patent is subject to a terminal disclaimer.

[21] Appl. No.: 08/861,151

[22] Filed: May 21, 1997

[51] Int. Cl.$^6$ ................................................... B65B 53/00
[52] U.S. Cl. ............................................................ 53/441
[58] Field of Search ........................................ 53/441, 556

[56] References Cited

U.S. PATENT DOCUMENTS

| | | | |
|---|---|---|---|
| 3,645,992 | 2/1972 | Elston | 260/80.78 |
| 3,748,962 | 7/1973 | Hilkert et al. | 90/4 |
| 3,986,611 | 10/1976 | Dreher | 206/386 |
| 4,011,382 | 3/1977 | Levine et al. | 526/96 |

(List continued on next page.)

FOREIGN PATENT DOCUMENTS

| | | | |
|---|---|---|---|
| 0 600 425 | 11/1993 | European Pat. Off. | B32B 27/32 |
| WO 92/17539 | 10/1992 | WIPO | C08L 23/06 |
| WO 4/14855 | 7/1994 | WIPO | C08F 4/628 |
| WO 94/25271 | 11/1994 | WIPO | B32B 7/08 |
| WO 94/26816 | 11/1994 | WIPO | C08L 23/08 |

OTHER PUBLICATIONS

Chowdhury, et al., "Polymers by Blueprint: Metallocene catalysts, the biggest thing to hit plastics since LLDPE, transform workhorse resins into engineering plastics," *Chemical Engineering* (Apr. 1993), pp. 34–39.

Schut, "Competition for Metallocenes Could Turn Ugly," *Plastics World* (Jan. 1995), pp. 33–36.

Product Literature, Dow Chemical Company, "Dow Resins for Stretch Film Applications–An Overview", p. 1. 5, Oct., 1994.

Product Literature, Dow Chemical Company, "Dow Skin Resins for Cast Stretch Film Applications", pp. 3.1–3.4, Oct., 1994.

Product Literature, Dow Chemical Company, "Engage Polyolefin Elastomer for Industrial Collation Packaging", KC 8852, May, 1994.

"Advantages of Metallocene Ethylene Polymer Resin Blends in Blown and Cast Films", Research Disclosure, Aug. 1995, pp. 565–573.

"Advantages of Metallocene Ethylene Polymer Resin Blends in Cast Film", Research Disclosure, Aug. 1995, pp. 556–557.

(List continued on next page.)

*Primary Examiner*—Linda Johnson
*Attorney, Agent, or Firm*—Arnold White & Durkee

[57] ABSTRACT

A method of stretch wrapping an item with a multilayer, thermoplastic stretch wrap film. The stretch wrap film containing at least three polymeric film layers and comprised of a first layer and a second layer. The first and second layers may comprise a polymer of two or more monomers, wherein a first monomer is ethylene, in a major amount by weight, and a second monomer is an alpha olefin of from about 3 to about 12 carbon atoms, in a minor amount by weight. If the first and second layers are outer layers, they have a cling force to each other of at least about 140 grams/inch. The stretch wrap film also has at least one inner polymeric layer, located between the first and second layers. The inner polymeric layer comprises a low polydispersity polymer having a polydispersity of from about 1 to about 4, a melt index ($I_2$) of from about 0.5 to about 10 g/10 min, and a melt flow ratio ($I_{20}/I_2$) of from about 12 to about 22. The inner layer(s) comprise(s) from about 5 wt. % to about 40 wt. % of the stretch wrap film so as to produce a film having a maximum stretch of at least 340%, a F-50 dart drop value of at least about 130 g/mil, a machine directional tear resistance of at least about 125 g/mil and a transverse directional tear resistance of at least about 500 g/mil. It is contemplated that additional outer layers may be added such an outer high cling layer or an outer slip layer, as well as additional inner layers.

83 Claims, 1 Drawing Sheet

U.S. PATENT DOCUMENTS

| | | | |
|---|---|---|---|
| 4,050,221 | 9/1977 | Lancaster, III et al. | 53/211 |
| 4,076,698 | 2/1978 | Anderson et al. | 526/348.6 |
| 4,163,831 | 8/1979 | Gessell | 526/153 |
| 4,205,021 | 5/1980 | Morita et al. | 525/240 |
| 4,302,565 | 11/1981 | Goeke et al. | 526/88 |
| 4,302,566 | 11/1981 | Karol et al. | 526/125 |
| 4,359,561 | 11/1982 | Fraser et al. | 526/88 |
| 4,399,173 | 8/1983 | Anthony et al. | 428/35 |
| 4,399,180 | 8/1983 | Briggs et al. | 428/212 |
| 4,418,114 | 11/1983 | Briggs et al. | 428/218 |
| 4,461,873 | 7/1984 | Bailey et al. | 525/240 |
| 4,511,609 | 4/1985 | Craver et al. | 428/35 |
| 4,522,987 | 6/1985 | Hogan et al. | 526/106 |
| 4,565,720 | 1/1986 | Yaeo et al. | 428/35 |
| 4,574,104 | 3/1986 | Aishima et al. | 428/220 |
| 4,588,650 | 5/1986 | Mientus et al. | 428/516 |
| 4,808,561 | 2/1989 | Welborn, Jr. | 502/104 |
| 4,833,017 | 5/1989 | Benoit et al. | 428/323 |
| 4,871,523 | 10/1989 | Datta et al. | 423/265 |
| 4,871,705 | 10/1989 | Hoel | 502/117 |
| 4,925,821 | 5/1990 | Chang | 502/107 |
| 4,925,825 | 5/1990 | Tachi et al. | 502/309 |
| 4,937,301 | 6/1990 | Chang | 526/128 |
| 5,001,205 | 3/1991 | Hoel | 526/128 |
| 5,006,500 | 4/1991 | Chang | 502/107 |
| 5,017,655 | 5/1991 | Kase et al. | 525/127 |
| 5,019,315 | 5/1991 | Wilson | 264/171 |
| 5,026,798 | 6/1991 | Canich | 526/127 |
| 5,032,652 | 7/1991 | Chang | 526/129 |
| 5,049,423 | 9/1991 | German, Jr. | 428/35.2 |
| 5,079,205 | 1/1992 | Canich | 502/117 |
| 5,084,534 | 1/1992 | Welborn, Jr. et al. | 526/160 |
| 5,085,927 | 2/1992 | Dohrer | 428/220 |
| 5,124,418 | 6/1992 | Welborn, Jr. | 526/114 |
| 5,173,343 | 12/1992 | Arvedson et al. | 428/34.9 |
| 5,183,867 | 2/1993 | Welborn, Jr. | 526/114 |
| 5,206,075 | 4/1993 | Hodgson, Jr. | 428/216 |
| 5,248,547 | 9/1993 | Wilson | 428/218 |
| 5,272,016 | 12/1993 | Ralph | 428/516 |
| 5,273,809 | 12/1993 | Simmons | 428/212 |
| 5,278,272 | 1/1994 | Lai et al. | 526/348.5 |
| 5,279,872 | 1/1994 | Ralph | 428/34.9 |
| 5,283,128 | 2/1994 | Wilhoit | 428/516 |
| 5,296,580 | 3/1994 | Matsunaga et al. | 53/441 X |
| 5,334,428 | 8/1994 | Dobreski et al. | 428/34.9 |
| 5,358,792 | 10/1994 | Mehta et al. | 428/516 |
| 5,374,459 | 12/1994 | Mumpower et al. | 428/36.7 |
| 5,376,439 | 12/1994 | Hodgson et al. | 428/220 |
| 5,380,810 | 1/1995 | Lai et al. | 56/352 |
| 5,382,631 | 1/1995 | Stehling et al. | 525/240 |
| 5,395,471 | 3/1995 | Obijeski et al. | 156/244.11 |
| 5,397,613 | 3/1995 | Georgelos | 428/36.7 |
| 5,397,640 | 3/1995 | Georgelos et al. | 428/349 |
| 5,399,426 | 3/1995 | Koch et al. | 428/335 |
| 5,407,732 | 4/1995 | Dokurno | 428/213 |
| 5,419,795 | 5/1995 | Wood et al. | 156/184 |
| 5,419,934 | 5/1995 | Wilson | 428/34.9 |
| 5,420,220 | 5/1995 | Cheruvu et al. | 526/348.1 |
| 5,431,284 | 7/1995 | Wilson | 206/597 |
| 5,451,450 | 9/1995 | Erderly et al. | 428/220 |
| 5,451,468 | 9/1995 | Seiler et al. | 428/515 |
| 5,460,861 | 10/1995 | Vicik et al. | 428/34.9 |
| 5,462,807 | 10/1995 | Halle et al. | 428/500 |
| 5,482,770 | 1/1996 | Bekele | 428/339 |
| 5,482,771 | 1/1996 | Shah | 428/349 |
| 5,491,019 | 2/1996 | Kuo | 428/213 |
| 5,523,136 | 6/1996 | Fischer et al. | 428/35.2 |
| 5,530,065 | 6/1996 | Farley et al. | 525/240 |
| 5,543,223 | 8/1996 | Shah | 428/349 |
| 5,558,930 | 9/1996 | DiPoto | 428/216 |
| 5,595,050 | 1/1997 | Koch et al. | 53/441 |
| 5,617,707 | 4/1997 | Simmons | 53/441 |

OTHER PUBLICATIONS

"Advantages of Metallocene Ethylene Polymer Resins in Blown and Cast Stretch Films", Research Disclosure, Aug. 1995, pp. 539–545.

Leaversuch, R., "LDPE, mPE vie in Flexible Film Market", *Modern Plastics,* Sep. 1994, pp. 23 & 25.

Product Literature, *To Give Your Customers' Used Stretch Film A New Lease On Life, Turn The Page,* Mobil, 4 pgs.

Product Literature, *Recycling Loop for Stretch Film,* Mobil, 2 pgs.

Product Literature, *Stretch Film Recycling,* Mobil, 2 pgs.

STRETCH WRAP FILMS

FIELD OF THE INVENTION

The present invention is directed to stretch wrap films and methods for their use. In particular, the present invention is directed to stretch wrap films having excellent puncture resistance, high elongation to break, relatively low force to stretch the film, high cling force, and overall strength.

BACKGROUND OF THE INVENTION

The use of thermoplastic stretch wrap films for the overwrap packaging of goods, and in particular, the unitizing of palleted loads is a commercially significant application of polymer film, including generically, polyethylene. Overwrapping a plurality of articles to provide a unitized load can be achieved by a variety of techniques. In one procedure, the load to be wrapped is positioned upon a platform, or turntable, which is made to rotate and, in so doing, to take up stretch wrap film supplied from a continuous roll. Braking tension is applied to the film roll so that the film is continuously subjected to a stretching, or tensioning, force as it wraps around the rotating load in overlapping layers. Generally, the stretch wrap film is supplied from a vertically arranged roll positioned adjacent to the rotating pallet load. Rotational speeds of from about 5 to 50 revolutions per minute are common. At the completion of the overwrap operation, the turntable is completely stopped and the film is cut and attached to an underlying layer of film employing tack sealing, adhesive tape, spray adhesives, etc. Depending upon the width of the stretch wrap roll, the load being overwrapped can be shrouded in the film while the vertically arranged film roll remains in a fixed position. Alternatively, the film roll, for example, in the case of relatively narrow film widths and relatively wide pallet loads, can be made to move in a vertical direction as the load is being overwrapped whereby a spiral wrapping effect is achieved on the packaged goods.

Another wrapping method finding acceptance in industry today is that of hand wrapping. In this method, the film is again arranged on a roll, however, it is hand held by the operator who walks around the goods to be wrapped, applying the film to the goods. The roll of film so used may be installed on a hand-held wrapping tool for ease of use by the operator.

Some of the properties desired of a good stretch wrap film are as follows: good cling or cohesion properties, high puncture resistance, high tear resistance in the transverse direction, good machine direction tear resistance, good transparency, low haze, low stress relaxation with time, high resistance to transverse tear especially when under machine direction tension, producible in thin gauges, low specific gravity and thus high yield in area per pound, good tensile toughness, high machine direction ultimate tensile strength, high machine direction ultimate elongation, and low modulus of elasticity.

Physical properties which are particularly significant for the successful use of thermoplastic films in stretch wrap applications include their puncture resistance, their elongation characteristics, their toughness and their resistance to tearing while under tension. In general, tensile toughness is measured as an area under a stress-strain curve developed for a thermoplastic film and it may be considered as the tensile energy absorbed, expressed in units of ft. lbs./cu. in. to elongate a film to break under tensile load. In turn, this toughness characteristic is a function of the capacity of such films to elongate. The process of stretching the film decreases that capacity. Accordingly, the stretch wrap process will decrease the toughness of the film while it is in its stretched condition as an overwrap as compared to its unstretched form. Generally this loss of toughness is proportional to the amount of stretch imparted to the film as it is overwrapping a load of goods.

Currently, different grades of stretch wrap films are commonly marketed for different end uses according to overall film properties. For example, certain stretch wrap films having superior properties for load retention are characterized by requiring a higher force to stretch the film. However, such load retention films generally have poor puncture characteristics at such stretch conditions. On the other hand, certain stretch wrap films having superior puncture resistance properties have low load retention properties.

A need exists to develop superior stretch wrap films characterized by having good cling properties, excellent maximum stretch, relatively low force required to stretch the film, good tear directional resistance relative to the machine direction tear, and excellent puncture resistance. Such films could be used in a variety of end applications where puncture tear hazards exist on loads that require low load retention to contain the load.

SUMMARY OF THE INVENTION

The present invention provides for a method of wrapping items with superior stretch wrap films having improved cling, maximum stretch, tear, and puncture resistance properties, as well as relatively low force required to stretch the film. The films of the present invention have improved these properties without undue degradation of other important film properties.

The stretch wrap film of the present invention is a multilayer film construction comprising a first layer, a second layer, and at least one inner polymeric layer located between the first and second layers. The stretch wrap films of the present invention can be used in cling/cling film applications and cling/slip film applications.

The first and second layers may be constructed of olefin polymer resins. These first and second layers are preferably constructed with a copolymer or a terpolymer of ethylene and a minor amount of at least one alpha olefin of from about 3 to about 12 carbon atoms. If the first and second layers are outer layers, then they have a cling force to each other of at least about 140 g/inch.

The inner polymeric layer comprises a polymer having a low polydispersity. The low polydispersity polymer has a polydispersity of from about 1 to about 4, a melt index ($I_2$) of from about 0.5 to about 10 g/10 in., and a melt flow ratio ($I_{20}/I_2$) of from about 12 to about 22. The inner polymeric layer(s) comprise(s) about 5 wt. % to about 40 wt. % of the stretch wrap film, preferably about 5 wt. % to about 30 wt. %, and most preferably about 10 wt. % to about 20 wt. %. The low polydispersity polymer used to construct the inner polymeric layer is preferably produced utilizing metallocene catalyst polymerization techniques. The low polydispersity polymer may be comprised of a polyethylene copolymer or a terpolymer. The inner polymeric layer may comprise a blend of resins with the low polydispersity polymer. The multilayer film may be constructed with additional inner layers. For instance, additional inner polymeric layers may be incorporated adjacent to said first inner polymeric layer. The additional inner polymeric layer(s) are preferably constructed with the same or different metallocene-catalyzedpolyethylene resins as the first inner polymeric layer.

Additional layers may be incorporated in the stretch wrap film. For example, an outer high cling layer may be located on an outer surface of the first layer or on an outer surface of the inner polymeric layer. The outer high cling layers are defined herein as layers having a cling force to each other of at least about 300 grams/inch. Additionally, an outer slip layer may be located on an outer surface of the first layer or on an outer surface of the second layer.

The multilayer film of the present invention will have a maximum stretch of at least 340%, a F-50 dart drop value of at least about 130 g/mil, a machine directional tear resistance of at least about 125 g/mil and a transverse directional tear resistance of at least about 500 g/mil.

DETAILED DESCRIPTION OF THE INVENTION

Figure 1:
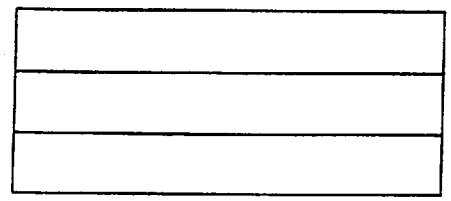
FIG. 1 shows a three layer cling/cling film constructed in accordance with the present invention.

The stretch wrap film of the present invention is a multilayer film construction comprising a first layer, a second layer, and at least one inner polymeric layer located between the first and second layers. These multilayer stretch wrap films can be prepared as cast films by conventional coextrusion techniques. The stretch wrap films of the present invention may be used in cling/cling and slip/cling film applications.

First and Second Layers

The first and second layers of the stretch wrap films of the present invention may be constructed of olefin polymer resins. Suitable polyethylene resins are those ethylenic copolymers that comprise a major proportion by weight of ethylene copolymerized with a minor proportion by weight of an alpha olefin monomer containing about 3 to about 12, preferably about 4 to about 10, and more preferably about 4 to about 8, carbon atoms. These resins have a polydispersity which is preferably in the range of from about 3 to about 7.

Ethylenic copolymers may be those commonly referred to as linear low density polyethylenes (LLDPE) and very low density polyethylenes (VLDPE). Preferably the ethylenic copolymers employed are those having from about 1 to about 20, preferably from about 1 to about 10 weight percent of said higher alpha olefin monomer copolymerized therein. In addition, the alpha olefin monomer employed in the ethylenic copolymer may be selected from the group consisting of 1-butene, 3-methyl-1-butene, 3-methyl-1-pentene, 1-hexene, 4-methyl-1-pentene, 3-methyl-1-hexene, 1-octene and 1-decene. Particularly preferred are the 1-hexene alpha olefins. The LLDPE resins are prepared at relatively low pressures employing coordination-type catalysts. Reference may be made to U.S. Pat. Nos. 3,645,992, 4,076,698, 4,011,382, 4,163,831, 4,205,021, 4,302,565, 4,302,566, 4,359,561 and 4,522,987 for more details of the manufacture and properties of LLDPE resins including those which are particularly useful herein.

The polyethylene resins that are desired to be used as the first and second layers in films of the present invention are those that are functionally defined as providing a cling force of at least about 140, generally at least about 180, preferably at least about 200, and more preferably about 220 grams/inch as determined by the ASTM D 5458-94 test as long as the first and second layers are the outer layers. Generally, the cling force of the outer first and second layers will be in the range of from about 140 to about 280 grams/inch.

Common LLDPE resins that can be used to form the first and second layers include those having a relatively high weight percentage of n-hexane extractables, as measured by the n-hexane extractables method of 21 C.F.R. 177,1520. Generally, the LLDPE used in the first and second layers herein will contain from about 2 to about 10, preferably from about 2 to about 8, more preferably from about 2.5 to about 5, weight percent of n-hexane extractables.

The LLDPE resins that can be used in the first and second layers herein have a density ranging from about 0.890 to about 0.940 g/cm$^3$, more commonly from about 0.90 to about 0.93 g/cm$^3$, and a melt index ($I_2$) of from about 1 to about 10 g/10 min. as determined by ASTM D1238. Particularly preferred are those LLDPE resins possessing densities within the range of from about 0.915 to about 0.920 g/cm$^3$ and a melt index within the range of from about 2.0 to about 5.0 g/10 min. as determined by ASTM D1238. Examples of such LLDPE resins include those set forth in U.S. Pat. No. 5,273,809, which is incorporated herein by reference in its entirety.

The VLDPE resins that can be used in the first and second layers have a density ranging from about 0.880 to about 0.912 g/cm$^3$, more commonly from about 0.89 to about 0.91 g/cm$^3$, and a melt index of from about 0.5 to about 5 g/10 min., preferably from about 1 to about 3 g/10 min.

The LLDPE and VLDPE resins that can be used in the first and second layers can be blended with minor amounts, e.g., up to about 40 weight percent total, of one or more other suitable resins to achieve a desired range of physical/mechanicalproperties in the film product. Thus, for example, such resins as ethyl vinyl acetate (EVA) copolymer, high pressure low density polyethylene (HPLDPE), and other LLDPE resins may be used for blending to obtain useful mixtures for forming the first and second layers of the films of this invention.

The LLDPE and VLDPE resins that can be used in the first and second layers herein can also contain known and conventional cling additives to augment the cling property that, at least in the case of the particularly preferred resins, is inherently exhibited. Examples of useful cling additives include poly-isobutyleneshaving a number average molecular weight in the range from about 1,000 to about 3,000, preferably about 1,200 to about 1,800, as measured by vapor phase osmometry, amorphous atactic polypropylenes, e.g., those having an average molecular weight of about 2000, and polyterpenes and ethylene-vinyl acetate copolymers containing from about 5 to about 15 weight percent copolymerized vinyl acetate. The optional cling additive may be present in the first and second layers in a concentration of from about 0.5 to about 10 weight percent of the resin. Of course, other conventional film additives such as antioxidants, UV stabilizers, pigments, dyes, etc., may be present in the usual amounts.

It is preferred to utilize the LLDPE resins that contain relatively high weight percentages of n-hexane extractables for both the first and second layers due to overall performance results. However, one or both of the first and second layers may comprise, for example, a first ethylene monomer and a second monomer that comprises an acrylate. On example is an ethylene-acrylate (EA) polymer film shown in U.S. Pat. No. 5,049,423, which is incorporated herein by reference in its entirety. These EA polymers generally have an acrylate content between about 2 to about 40%, preferably between about 10 to about 35%, by weight of the EA polymer. The acrylate useful in these polymers are those generally known in the art, preferably methyl, ethyl, and n-butyl acrylate. Other known cling layers are contemplated for the present invention.

Either or both of the outer surfaces of the first and second layers can be treated by such known and conventional post-forming operations as corona discharge, chemical treatment, flame treatment, etc., to modify the printability or ink receptivity of the surface(s) or to impart other desirable characteristics thereto.

Inner Polymeric Layer

The multilayer stretch wrap films of the present invention are constructed with at least one inner polymeric layer. The inner polymeric layer comprises a polymer having a low polydispersity. The low polydispersity polymer may be prepared from a partially crystalline polyethylene resin that is a polymer prepared with ethylene and at least one alpha olefin monomer, e.g., a copolymer or terpolymer. The alpha olefin monomer generally has from about 3 to about 12 carbon atoms, preferably from about 4 to about 10 carbon atoms, and more preferably from about 6 to about 8 carbon atoms. The alpha olefin comonomer content is generally below about 30 weight percent, preferably below about 20 weight percent, and more preferably from about 1 to about 15 weight percent. Exemplary comonomers include propylene, 1-butene, I-pentene, 1-hexene, 3-methyl-1-pentene, 4-methyl-1-pentene, 1-octene, 1-decene, and 1-dodecene.

The low polydispersity polymer generally has the characteristics associated with an LLDPE material, however it has improved properties as explained more fully below. The low polydispersity polymer defined herein has a density of from about 0.88 to about 0.94 g/cm$^3$, preferably from about 0.88 to about 0.93 g/cm$^3$, and more preferably from about 0.88 to about 0.925 g/cm$^3$.

The average molecular weight of the low polydispersity polymer can generally range from about 20,000 to about 500,000, preferably from about 50,000 to about 200,000. The molecular weight is determined by commonly used techniques such as size exclusion chromatography or gel permeation chromatography. The low polydispersity polymer should have a molecular weight distribution, or polydispersity, ($M_w/M_n$, "MWD") within the range of about 1 to about 4, preferably about 1.5 to about 4, more preferably about 2 to about 4, and even more preferably from about 2 to about 3. The ratio of the third moment to the second moment, $M_z/M_w$, is generally below about 2.3, preferably below about 2.0, and more typically in the range of from about 1.6 to about 1.95. The melt flow ratio (MFR) of these polymers, defined as $I_{20}/I_2$ and as determined in accordance to ASTM D1238, is generally from about 12 to about 22, preferably from about 14 to about 20, and more preferably from about 16 to about I S. The melt index (MI), defined as the $I_2$ value, should be in the range of from about 0.5 to about 10 g/10 min., preferably from about 1 to about 5 g/10 min. as determined by ASTM D1238. If additional resin materials are to be incorporated with the low polydispersity polymer, it is preferred to maintain the level of the low polydispersity polymer to at least about 60 weight percent of the inner polymeric layer.

Useful low polydispersity polymers are available from, among others, Dow Chemical Company and Exxon Chemical Company who are producers of single site or constrained geometry catalyzed polyethylenes. These polymers are commercially available as the AFFINITY and EXXACT polyethylenes (see Plastics World, p. 33–36, January 1995), and also as the ENHANCED POLYETHYLENE and EXCEED line of resins. The manufacture of such polyethylenes, generally by way of employing a metallocene catalyst system, is set forth in, among others, U.S. Pat. Nos. 5,382,631, 5,380,810, 5,358,792, 5,206,075, 5,183,867, 5,124,418, 5,084,534, 5,079,205, 5,032,652, 5,026,798, 5,017,655, 5,006,500, 5,001,205, 4,937,301, 4,925,821, 4,871,523, 4,871,705, and 4,808,561, each of which is incorporated herein by reference in its entirety. These catalyst systems and their use to prepare such copolymer materials are also set forth in EP 0 600 425 A1 and PCT applications WO 94/25271 and 94/26816. The low polyethylene polymers thus produced generally have a crystalline content in excess of at least 10 weight percent, generally in excess of at least 15 weight percent.

The above patents and publications generally report that these catalysts contain one or more cyclopentadienyl moieties in combination with a transition metal. The metallocene catalyst may be represented by the general formula $C_cMA_aB_b$ wherein C is a substituted or unsubstituted cyclopentadienyl ring; M is a Group 3–10 metal or Lanthanide series element, generally a Group IVB, VB, or VIB metal; A and B are independently halogen, hydrocarbyl group, or hydrocarboxyl groups having 1–20 carbon atoms; a=0–3, b=0–3, and c=1–3. The reactions can take place in either gas phase, high pressure, slurry, or solution polymerization schemes.

At least one inner polymeric layer of the multilayer film of the present invention is preferably constructed entirely of a low polydispersity polymer, preferably produced through metallocene catalyst technology. However, the inner polymeric layer may comprise a blend of the low polydispersity polymer with a second resin material. The second resin material is preferably a LLDPE resin having a density of between about 0.89 and about 0.94 g/cm$^3$, a LDPE resin having a density of between about 0.9 and about 0.935 g/cm$^3$, or a VLDPE resin having a density of between about 0.88 and about 0.91 g/cm$^3$. The comonomer for the second resin material preferably has from about 4 to about 10, more preferably from about 6 to about 8 carbon atoms. If a second resin material is to be incorporated with the metallocene-catalyzed resin, it is preferred to maintain the level of the metallocene-catalyzed resin to at least about 60 wt. %, preferably at least about 70 wt. %, and more preferably at least about 80 wt. %, of the inner polymeric layer. The resultant blended resin should maintain the desired properties of the metallocene-catalyzed resin material and may be more economical for certain applications.

Additional Layers

Additional layers are contemplated in the stretch wrap film of the present invention. For example, the stretch wrap film may comprise an outer high cling layer which may be located on an outer surface of the inner polymeric layer or an outer surface of the first layer. The outer high cling layer provides a cling force of at least about 300 grams/inch as determined by the ASTM D5458-94 test method. Preferably, the outer high cling layer provides a cling force of at least about 350 grams/inch and is constructed in a manner similar to that described above with the first and second layers. The outer high cling layer will typically be a pure resin in order to obtain the higher cling forces. Some examples of high cling resins are resins such as EA polymers discussed above and very low density polyethylenes (VLDPE). The VLDPE resins typically have a density of from about 0.88 to about 0.910 g/cm$^3$ and a melt index ($I_2$) of from about 1 to about 10 g/10 min. and preferably from about 2 to about 5 g/10 min.

The stretch wrap film of the present invention may also comprise an outer slip layer which may be constructed of various resin materials suitable for such purposes. The outer slip layer may be located on an outer surface of the first layer or on an outer surface of the second layer. Examples of such resins include polyolefin resins and copolymers of polyolefins such as polyethylene, polypropylene, and combinations thereof. Suitable polymer resins additionally include copolymers of polyethylene with minor amounts of other $C_{4-10}$ olefins, particularly $C_{6-8}$ polyolefins. Preferred polyethylenes include HPLDPE resins having a density of from about 0.92 to about 0.94 g/cm$^3$, and a melt index ($I_2$) of from about 1.0 to about 4.0 g/10 min., and LLDPE resins having a density of from about 0.925 to about 0.945 g/cm$^3$, and a melt index of from about 2.0 to about 5.0 g/10 min. Preferred polymers include polypropylenes, preferably isotactic, having a density of from about 0.89 to about 0.91 g/cm$^3$, and a melt index ($I_2$) of from about 5 to about 25 g/10 min. as determined by ASTM D1238.

The outer slip layer may include any of several anticling, slip or antiblock additives to improve the slip characteristics of the layer. Such additives include silicas, talcs, diatomaceous earth, silicates, lubricants, etc. These additives are generally blended with the resin material in an amount of from about 100 to about 20,000 ppm. When an outer slip layer is present in the stretch wrap film, an outer high cling layer will preferably be included as a layer in the stretch wrap film.

Additionally interior layers are also contemplated in the present invention to provide barrier properties or cost reductions.

Figure 2:
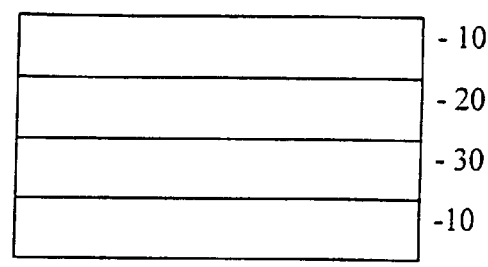
FIG. 2 shows a four layer cling/cling film constructed in accordance with the present invention.
Figure 3:
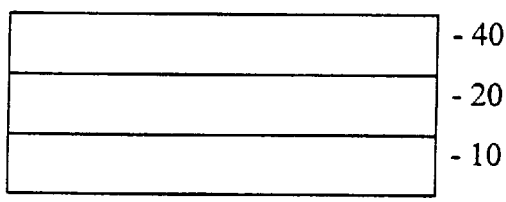
FIG. 3 shows a three layer high cling/cling film constructed in accordance with the present invention.
Figure 4:
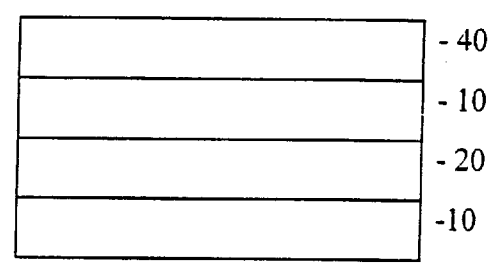
FIG. 4 shows a four layer high cling/cling film constructed in accordance with the resent invention.
Figure 5:
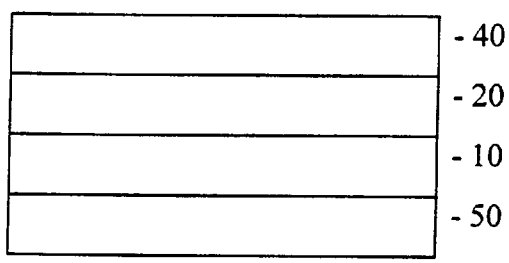
FIG. 5 shows a four layer high cling/slip film constructed in accordance with the present invention.
Figure 6:
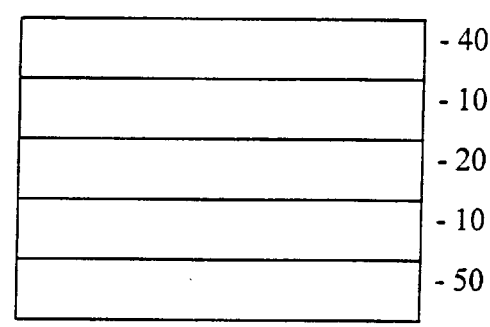
FIG. 6 shows a five layer high cling/slip film constructed in accordance with the present invention.

The stretch wrap films of the present invention can be constructed to contain a plurality of layers of the film in various combinations. According to one embodiment, the film will be of an A/B/A construction as shown in FIG. 1 wherein the film layers (10) are the first and second layers (layers A) and the film layer (20) is the inner polymeric layer (layer B). Film layers A and B may be constructed from polymeric blends. Alternatively, stretch wrap films may be prepared with an additional layer (layer C), such as inner polymeric layer (30). The innerpolymeric layers (20,30) may be constructed with the same resins or with different resins to obtain the desired properties of the multilayer film, e.g. A/B/C/A film of FIG. 2. Other types of multi-layered constructions are contemplated such as a D/B/A construction and a D/A/B/A construction depicted in respective FIGS. 3 and 4 wherein film layer (40) is an outer high cling layer (layer D). In addition, a D/B/A/E construction and a D/A/B/A/E construction are contemplated and depicted in respective FIGS. 5 and 6 wherein film layer (50) is an outer slip layer (layer E).

Stretch Wrap Properties

The overall stretch wrap films of the present invention have a cling force of at least about 140, generally at least about 180, preferably at least about 200, more preferably at least about 220 grams/inch as determined by ASTM D5458-94. Generally, the cling force of the film will be in the range of from about 140 to about 280 g/inch if the first and second layers are the outer layers. However, if an outer high cling layer is used the film will be generally in the range of from about 300 to about 350 g/inch as determined by ASTM D5458-94.

The overall stretch wrap films have relatively high puncture resistance, as measured by the F-50 dart drop test procedure (ASTM D1709). It is the experience of those skilled in the art that the F-50 dart drop test is well correlated to the end use puncture resistance of stretch wrap films. The F-50 dart drop of the stretch wrap films is at least about 130 g/mil, preferably at least about 150 g/mil, and more preferably from at least about 170 g/mil.

The stretch wrap films are constructed such that the overall transverse direction tear resistance (TD Tear), as determined by ASTM D1922, is at least about 500 g/mil, preferably at least about 550 g/mil, more preferably at least about 600 g/mil. The machine direction tear resistance (MD Tear), as determined by ASTM D1922, of the film is generally at least about 125 g/mil, preferably at least about 150 g/mil, and more preferably at least about 175 g/mil.

A parameter used to analyze the performance of stretch wrap films is the stress that results when the film is stretched to a desired percentage of its original length. This stress is indicative of the load retention characteristics of the film and is determined in accordance with ASTM D882. The films of the present invention generally have a stress level at 200% elongation of at least about 1400 psi., preferably at least about 1450 psi., and more preferably at least about 1500 psi. The films of the present invention generally have a stress level at 250% elongation of at least about 1500 psi., preferably at least about 1550 psi., and more preferably at least about 1600 psi.

The stretch wrap film of this invention may, if desired, be provided in the non-stretched, i.e., unoriented, or at most only modestly stretched, state prior to use. The films of the present invention are capable of being stretched from at least about 340, more preferably from at least about 360, and more preferably at least about 380 linear percent.

The films of the present invention generally have a gloss of at least about 88% and a haze of below about 2.5%.

The film configurations are constructed according to conventional practices. One processing technique is to coextrude and cast the films in a simultaneous fashion, however in some cases it may be appropriate to first coextrude at least two film layers and thereafter extrusion coat the remaining film layers. Conventional techniques of coextrusion may be employed to assemble the composite structures of the films of this invention. Reference may be made to U.S. Pat. No. 3,748,962, the contents of which are herein incorporated by reference in its entirety, for details of a coextrusion procedure which can be employed in the fabrication of a multilayer film in accordance with this invention. Generally, the resin materials are heated to their molten state and their viscosities are coordinated to prepare multilayer films in a uniform manner. The molten materials are conveyed to a coextrusion adapter that combines the molten materials to form a multilayer coextruded structure. The layered polymeric material is transferred through an extrusion die opened to a predetermined gap commonly in the range of between about 0.05 in. (0.13 cm) and about 0.012 in. (0.03 cm). The material is then drawn down to the intended gauge thickness by means of a primary chill or casting roll maintained at about 60 to about 130° F. (15–55° C.). Typical draw down ratios range from about 5:1 to about 40:1.

The overall thickness of the stretch wrap film can vary widely according to end use specifications, but is generally in the range of the typical thicknesses for stretch wrap films. Conventional for such films is a thickness of from about 0.4 to about 3 mils, and is application specific.

The pallet unitizing techniques described in U.S. Pat. Nos. 3,986,611 and 4,050,221 are contemplated herein. The disclosures of these patents are incorporated herein in their entirety by reference.

EXAMPLES

The following examples were conducted to demonstrate various aspects of the multilayer films of the present invention. The procedures utilized in the following examples are set forth in Table 1.

TABLE 1

STRETCH FILM TEST PROCEDURES

| TEST PROCEDURE | ASTM TEST METHOD |
|---|---|
| Tensile Yield Machine Direction (MD) | D882 |
| Tensile Ultimate MD | D882 |
| Tensile Elongation MD | D882 |
| Tensile Force @ | |
| 200% Stretch | D882 |
| 250% Stretch | D882 |
| 300% Stretch | D882 |
| 350% Stretch | D882 |
| Elmendorf Tear MD | D1922 |
| Elmendorf Tear Transverse Direction (TD) | D1922 |
| Total Energy Dart Drop | D4272 |
| F-50 DartDrop | D1709 |
| Gardner Gloss | D2457 |
| Gardner Haze | D1003 |
| Instron Peel Cling | D5458 |
| Instron Probe Puncture Energy | — |

The probe puncture energy test was conducted by use of an Instron Universal tester that records a continuous reading of the force (stress) and penetration (strain) curve. A 6 in. by 6 in. film specimen is securely mounted to a compression load cell to expose a 4 in. by 4 in. area. A hemispherically shaped (1 in. dia.) stainless steel probe, traveling at a constant speed of 10 in./min. is lowered into the film. A stress/strain curve is recorded and plotted. Peak force is the maximum force encountered. The machine is used to integrate the area under the curve, which is indicative of the energy consumed during the penetration to rupture testing of the film. The probe penetration was also recorded in this test.

The films were also tested for performance in a stretch wrapper to determine various film properties that occur during the stretching operation. The testing was conducted at rates similar to those employed by commercial equipment. The film width was 20 inches for this test machine. The machine direction (MD) force at 200% elongation, and maximum stretch and force values at breakage, were determined.

The films of the Examples were prepared using a pilot scale commercial cast film line machine. The material melt temperatures ranged from about 480 to about 580° F. and were chosen to match melt viscosities of the various resins. The melts were conveyed to a coextrusion adapter that combines the melt flows into a multilayer coextruded structure. This layered flow was distributed through a single manifold film extrusion die to the required width. The die gap opening was nominally 0.025 inches. The material was drawn down to the final gauge. The material draw down ratio was about 31:1 for the 0.8 mil films. A vacuum box was used to pin the melt exiting the die opening to a primary chill roll maintained at about 90° F.

EXAMPLES

The results of the tests appear in Table 2. The comparative films were films 1–5 and the inventive films were films 6–12. The inventive films (films 6–12) were all coextruded in a three layered embodiment of A/B/A.

The first and second layers (layers A) of the inventive films were cling layers comprised of a LLDPE resin in which the alpha olefin monomer employed was 1-hexane. The LLDPE resin in layers A had a density of 0.917 g/cm$^3$ and a melt index (MI) of 3.3 g/10 min. The inner polymeric layer (layer B) of each inventive film comprised 100% metallocene-catalyzed linear low polyethylene or "mLLDPE". The inner polymeric layers comprised either a first mLLDPE resin having a 3.4 MI and a density of 0.917 g/cm$^3$ or a second mLLDPE resin having a 2.5 MI and a density of 0.917 g/cm$^3$. The inner polymeric layer comprised from about 10 wt. % to about 40 wt. % of the stretch wrap film.

Comparative film 1 comprised a 3.3 MI LLDPE resin with a density of 0.917 g/cm$^3$ (layer A). Comparative films 2 and 3 were entirely comprised of a 3.4 MI mLLDPE resin and a 2.5 MI mLLDPE resin respectively with densities of 0.917 g/cm$^3$ (layer B). Comparative films 4 and 5 were coextruded in a three layered embodiment of A/B/A. Comparative film 4 comprised a 3.3 MI LLDPE resin with a density of 0.917 g/cm$^3$ (layer A) and a 2.3 MI LLDPE resin with a density of 0.917 g/cm$^3$ (layer B). Comparative film 5 comprised a 3.4 MI mLLDPE resin with a density of 0.918 g/cm$^3$ (layer A) and a 3.3 MI LLDPE resin with a density of 0.918 g/cm$^3$ (layer B). In comparative films 4 and 5, layer B comprised 80 wt. % of the stretch wrap film.

The compositions of each layer are shown as a total percent of all the layers. For example, in Table 2, layer A comprised about 90 wt. % of the stretch wrap film in inventive film 6 in which each of the first and second layers were approximately 45 wt. % of the stretch wrap film. However, the proportions of the first and second layers (layers A) of the inventive films do not necessarily need to be equal. All of the inventive films (films 6–12), as well as the comparative films (films 1–5), were constructed at the same gauge of about 0.8 mil.

Referring specifically to Table 2, inventive films 6–12 showed significant improvement of cling properties over the comparative films 2 and 3 (see "unstretched cling I/O [inside/outside]"). Inventive films 6–12 showed a slight improvement in cling properties over comparative films 1, 4 and 5. All of the inventive films 6–12 showed a significant improvement in maximum stretch % over comparative films 2, 3 and 5. The inventive films showed little, if any, improvement in maximum stretch % over comparative film 4 and showed a slight decrease in the maximum stretch % of comparative film 1.

All of the inventive films (films 6–12) had a good transverse directional tear resistance (TD tear) relative to the machine directional tear resistance (MD tear). It is important to have a good TD tear relative to a MD tear under stretched conditions. Without this balance of MD and TD tear, the film catastrophically fails if any defect is present. Generally speaking, the TD tear of a stretch wrap film should have a value about two times greater than the MD tear and preferably about three times greater than the MD Tear. As shown in Table 2, comparative films 2, 3 and 5 do not have a good TD tear to MD tear ratio.

Most of the inventive films showed a much better puncture resistance, as measured by the F-50 dart drop test, than the comparative films 1 and 4. The F-50 dart drop increased for all the inventive films 6–12 as the weight percentage of the inner polymeric layer (layer B) increased. The inventive films 6–12 had a much lower F-50 dart drop value than that of the comparative films 2, 3 and 5. However, comparative films 2 and 3 with a single layer of metallocene-catalyzed LLDPE are not desirable for use as stretch wrap film due to their poor cling performance, low TD tear relative to the MD tear, and poor maximum stretch values. As discussed above, comparative film 5 does not have a good TD tear relative to MD tear.

TABLE 2

| SAMPLE No. | Comparative Films | | | | | | | | Inventive Films | | | | |
|---|---|---|---|---|---|---|---|---|---|---|---|---|---|
| | 1 | 2 | 3 | 4 | 5 | 6 | 7 | 8 | 9 | 10 | 11 | 12 |
| Average Gauge (mils) | 0.80 | 0.80 | 0.80 | 0.80 | 0.80 | 0.80 | 0.80 | 0.80 | 0.80 | 0.80 | 0.80 | 0.80 |
| Layer Configuration | A | B | B | A/B/A | A/B/A | A/B/A | A/B/A | A/B/A | A/B/A | A/B/A | A/B/A | A/B/A |
| Layer "A" % | 100 | | | 20 | 20 | 90 | 80 | 70 | 60 | 90 | 80 | 70 |
| Layer "B" % | | 100 | 100 | 80 | 80 | 10 | 20 | 30 | 40 | 10 | 20 | 30 |
| Layer "A" Resin | 3.3 MI LLDPE | | | 3.3 MI LLDPE | 3.3 MI LLDPE | 3.3 MI LLDPE | 3.3 MI LLDPE | 3.3 MI LLDPE | 3.3 MI LLDPE | 3.3 MI LLDPE | 3.3 MI LLDPE | 3.3 MI LLDPE |
| Layer "B" Resin | | 3.4 MI mLLDPE | 2.5 MI mLLDPE | 2.3 MI LLDPE | 3.4 MI mLLDPE | 3.4 MI mLLDPE | 3.4 MI mLLDPE | 3.4 MI mLLDPE | 3.4 MI mLLDPE | 2.5 MI mLLDPE | 2.5 MI mLLDPE | 2.5 MI mLLDPE |
| LAB ANALYSIS | | | | | | | | | | | | |
| MD Ultimate (psi) | 5,051.0 | 8,441.0 | 8,608.0 | 5,876.0 | 6,984.0 | 5,939.0 | 6,363.0 | 5,433.0 | 5,656.0 | 6,269.0 | 5,921.0 | 6,210.0 |
| MD Elongation (%) | 588.0 | 579.0 | 630.0 | 580.0 | 639.0 | 610.0 | 624.0 | 577.0 | 560.0 | 642.0 | 608.0 | 629.0 |
| MD Stress @ 200% Elong. (psi) | 1,596.0 | 1,655.0 | 1,701.0 | 1,619.0 | 1,586.0 | 1,604.0 | 1,594.0 | 1,598.0 | 1,629.0 | 1,564.0 | 1,578.0 | 1,509.0 |
| MD Stress @ 250% Elong. (psi) | 1,633.0 | N.A. | N.A. | 1,676.0 | 1,689.0 | 1,660.0 | 1,648.0 | 1,652.0 | 1,700.0 | 1,611.0 | 1,634.0 | 1,562.0 |
| MD Stress @ 300% Elong. (psi) | 1,712.0 | N.A. | N.A. | 1,839.0 | 1,887.0 | 1,774.0 | 1,832.0 | 1,853.0 | 1,914.0 | 1,722.0 | 1,802.0 | 1,737.0 |
| MD Stress @ 350% Elong. (psi) | 2,025.0 | N.A. | N.A. | 2,176.0 | 2,156.0 | 2,098.0 | 2,115.0 | 2,119.0 | 2,228.0 | 2,024.0 | 2,077.0 | 2,013.0 |
| MD Tear (grams/mil) | 266 | 378 | 353 | 254 | 359 | 226 | 233 | 237 | 249 | 190 | 176 | 184 |
| TD Tear (grams/mil) | 768 | 557 | 492 | 728 | 542 | 727 | 709 | 698 | 645 | 710 | 661 | 610 |
| Probe Puncture Energy (in-lbs) | 9.9 | 13.3 | 14.2 | 12.7 | 20.5 | 12.0 | 13.3 | 10.0 | 10.8 | 10.6 | 10.4 | 13.6 |
| Probe Penetration (in) | 3.8 | 4.1 | 4.2 | 4.2 | N.A. | 4.1 | 4.3 | 3.5 | 3.7 | 3.7 | 4.5 | 4.1 |
| F-50 Dart Drop (grams/mil) | 122.2 | 611 | 792.5 | 156.2 | 496.0 | 149.7 | 174.1 | 229.1 | 243.7 | 144.1 | 186.2 | 206.9 |
| Unstretched Cling I/O (grams/in) | 238.1 | 86.6 | 80.5 | 230.6 | 234.9 | 229.4 | 241.8 | 250.7 | 240.8 | 237.0 | 243.7 | 252.4 |
| Film Gloss % | 92.6 | 89.5 | 88.2 | 91.9 | 88.3 | 93.5 | 93.8 | 90.8 | 93.8 | 94.1 | 92.8 | 93.8 |
| Film Haze % | 1.76 | 2.60 | 2.18 | 1.55 | 2.06 | 1.67 | 1.70 | 1.88 | 1.78 | 1.68 | 1.63 | 1.68 |
| STRETCH WRAP TESTER | | | | | | | | | | | | |
| MD Force @ 200% Stretch (lbs/in) | 2.14 | 1.95 | 1.85 | 1.76 | 2.15 | 1.83 | 1.82 | 1.82 | 1.84 | 1.88 | 1.89 | 1.92 |
| Maximum Force (lbs/in) | 2.67 | 2.21 | 2.28 | 2.32 | 2.41 | 2.40 | 2.34 | 2.38 | 2.42 | 2.50 | 2.43 | 2.54 |
| Maximum Stretch % | 396 | 345 | 341 | 380 | 341 | 375 | 389 | 376 | 377 | 399 | 389 | 388 |

What is claimed is:

1. A method for stretch wrapping an item, comprising wrapping the item with a multilayer, thermoplastic stretch wrap film containing at least three polymeric film layers, said stretch wrap film comprising:
   (a) a first layer comprising a polymer of two or more monomers, wherein the first monomer is ethylene, in a major amount by weight, and the second monomer is an alpha olefin of from about 3 to about 12 carbon atoms, in a minor amount by weight;
   (b) a second layer comprising a polymer of two or more monomers, wherein the first monomer is ethylene, in a major amount by weight, and the second monomer is an alpha olefin of from about 3 to about 12 carbon atoms, in a minor amount by weight, at least one of said first layer and said second layer has sufficient cling resulting from inherent cling alone, cling additives or a combination thereof so as to produce a cling force to the other layer of at least about 140 grams/inch as determined by ASTM D5458-94; and
   (c) at least one inner polymeric layer, located between said first layer and said second layer, comprising a low polydispersity polymer, said low polydispersity polymer having a polydispersity of from about 1 to about 4, a melt index ($I_2$) of from about 0.5 to about 10 g/10 min., and a melt flow ratio ($I_{20}/I_2$) of from about 12 to about 22;
      wherein said stretch wrap film comprises from about 5 wt. % to about 40 wt. % of the total amount of said inner polymeric layer(s);
      so as to produce a stretch wrap film having a maximum stretch of at least 340%, an F-50 dart drop value of at least about 130 g/mil as determined by ASTM D1709, a machine directional tear resistance of at least about 125 g/mil and a transverse directional tear resistance of at least about 500 g/mil, and whereby said stretch wrap film is stretched during the wrapping step.

2. The method of claim 1 wherein said stretch wrap film comprises from about 5 wt. % to about 30 wt. % of the total amount of said inner polymeric layer(s).

3. The method of claim 2 wherein said stretch wrap film comprises from about 10 wt. % to about 20 wt. % of the total amount of said inner polymeric layer(s).

4. The method of claim 1 wherein said polydispersity is in the range of from about 1.5 to about 4.

5. The method of claim 4 wherein said polydispersity is in the range of from about 2 to about 4.

6. The method of claim 5 wherein said polydispersity is in the range of from about 2 to about 3.

7. The method of claim 1 wherein the density of said low polydispersity polymer is in the range of from about 0.88 to about 0.93 g/cm$^3$.

8. The method of claim 7 wherein the density of said low polydispersity polymer is in the range of from about 0.88 to about 0.925 g/cm$^3$.

9. The method of claim 1 wherein the melt index of said low polydispersity polymer is in the range of about 0.5 to about 5 g/10 min.

10. The method of claim 9 wherein the melt index of said low polydispersity polymer is in the range of about 0.5 to about 2 g/10 min.

11. The method of claim 1 wherein the melt flow ratio of said low polydispersity polymer is in the range of from about 14 to about 20.

12. The method of claim 11 wherein the melt flow ratio of said low polydispersitypolymer is in the range of from about 16 to about 18.

13. The method of claim 1 wherein said low polydispersity polymer is made with a metallocene catalyst.

14. The method of claim 1 wherein at least one of said first layer and second layer has a cling force to the other layer of at least about 180 grams/inch.

15. The method of claim 14 wherein at least one of said first layer and second layer has a cling force to the other layer of at least about 200 grams/inch.

16. The method of claim 15 wherein at least one of said first layer and second layer has a cling force to the other layer of at least about 220 grams/inch.

17. The method of claim 1 wherein the F-50 dart drop value is at least about 150 g/mil.

18. The method of claim 17 wherein the F-50 dart drop value is at least about 170 g/mil.

19. The method of claim 1 wherein the stretch wrap film has a maximum stretch of at least about 360%.

20. The method of claim 1 wherein the transverse direction tear resistance is at least about 550 g/mil.

21. The method of claim 19 wherein the stretch wrap film has a maximum stretch of at least about 380%.

22. The method of claim 19 wherein the stretch wrap film has a maximum stretch of at least about 380%.

23. The method of claim 1 wherein the machine direction tear resistance is at least about 150 g/mil.

24. The method of claim 23 wherein the machine direction tear resistance is at least about 175 g/mil.

25. The method of claim 1 wherein said stretch wrap film has a stress level at 200% elongation of at least 1400 psi.

26. The method of claim 25 wherein said stretch wrap film has the stress level at 200% elongation of at least 1500 psi.

27. The method of claim 1 wherein said stretch wrap film has a stress level at 250% elongation of at least 1450 psi.

28. The method of claim 27 wherein said stretch wrap film has the stress level at 250% elongation of at least 1600 psi.

29. The method of claim 1 wherein the second monomer of said first layer and said second layer are independently selected from the group consisting of propylene, 1-butene, 1-pentene, 1-hexene, 3-methyl-1-pentene, 4-methyl-1-pentene, 1-octene, 1-decene, and 1-dodecene.

30. The method of claim 29 wherein the second monomer of said first layer and said second layer are independently selected from the group consisting of 1-butene, 1-hexene, and 1-octene.

31. The method of claim 1 wherein said low polydispersity polymer is a polyethylene copolymer or terpolymer.

32. The method of claim 31 wherein at least one of said inner polymeric layers comprises at least about 60 wt. % of said polyethylene copolymer or terpolymer.

33. The method of claim 1 further comprising an outer high cling layer located on a surface of said first layer opposite of said inner polymeric layer.

34. The method of claim 33 wherein said outer high cling layer has a cling force to the second layer of at least about 300 grams/inch as determined by ASTM D5458-94.

35. The method of claim 34 wherein said outer high cling layer is chosen from the group consisting of an ethylene-acrylatepolymer and a very low density polyethylene.

36. The method of claim 35 wherein said very low density polyethylene has a density of form about 0.88 g/cm$^3$ to about 0.910 g/cm$^3$.

37. The method of claim 33 further comprising an outer slip layer located on a surface of said second layer opposite of said inner polymeric layer.

38. The method of claim 37 wherein said outer slip layer is chosen from the group consisting of polyethylene, polypropylene and combinations thereof.

39. The method of claim 1 further comprising a second inner polymeric layer located on an outer surface of the first inner polymeric layer.

40. The method of claim 39 wherein said second inner polymeric layer comprises a low polydispersity polymer said low polydispersity polymer having a polydispersity of from about 1 to about 4, a melt index ($I_2$) of from about 0.5 to about 10 g/10 min., and a melt flow ratio ($I_{20}/I_2$) of from about 12 to about 22.

41. A method for stretch wrapping an item, comprising wrapping the item with a multilayer, thermoplastic stretch wrap film containing at least three polymeric film layers, said stretch wrap film comprising:

(a) a first layer comprising a polymer of two or more monomers, wherein the first monomer is ethylene, in a major amount by weight, and the second monomer is an alpha olefin of from about 3 to about 12 carbon atoms, in a minor amount by weight;

(b) an outer high cling layer having sufficient cling resulting from inherent cling alone, cling additives or a combination thereof so as to produce a cling force to the first layer of at least about 300 grams/inch as determined by ASTM D5458-94; and (c) at least one inner polymeric layer, located between said first layer and said outer high cling layer, comprising a low polydispersity polymer, said low polydispersity polymer having a polydispersity of from about 1 to about 4, a melt index ($I_2$) of from about 0.5 to about 10 g/10 min., and a melt flow ratio ($I_{20}/I_2$) of from about 12 to about 22;

wherein said stretch wrap film comprises from about 5 wt. % to about 40 wt. % of the total amount of said inner polymeric layer(s);

so as to produce a stretch wrap multilayer film having a maximum stretch of at least 340%, an F-50 dart drop value of at least about 130 g/mil as determined by ASTM D1709, a machine directional tear resistance of at least about 125 g/mil and a transverse directional tear resistance of at least about 500 g/mil, and whereby said stretch wrap film is stretched during the wrapping step.

42. The method of claim 41 wherein said outer high cling layer is chosen from the group consisting of an ethylene-acrylatepolymer and a very low density polyethylene.

43. The method of claim 42 wherein said very low density polyethylene has a density of from about 0.88 g/cm$^3$ to about 0.910 g/cm$^3$.

44. A method for stretch wrapping an item, comprising wrapping the item with a multilayer, thermoplastic stretch wrap film containing at least four polymeric film layers, said stretch wrap film comprising:

(a) a first layer comprising a polymer of two or more monomers, wherein the first monomer is ethylene, in a major amount by weight, and the second monomer is an alpha olefin of from about 3 to about 12 carbon atoms, in a minor amount by weight;

(b) an outer high cling layer;

(c) at least one inner polymeric layer, located between said first layer and said outer high cling layer, comprising a low polydispersity polymer, said low polydispersity polymer having a polydispersity of from about 1 to about 4, a melt index ($I_2$) of from about 0.5 to about 10 g/10 min., and a melt flow ratio ($I_{20}/I_2$) of from about 12 to about 22; and (d) an outer slip layer located on an outer surface of the first layer, said outer high cling layer having sufficient cling resulting from inherent cling alone, cling additives or a combination thereof so as to produce a cling force to the outer slip layer of at least about 300 grams/inch as determined by ASTM D5458-94;

wherein said stretch wrap film comprises from about 5 wt. % to about 40 wt. % of the total amount of said inner polymeric layer(s);

so as to produce a stretch wrap film having a maximum stretch of at least 340%, an F-50 dart drop value of at least about 130 g/mil as determined by ASTM D1709, a machine directional tear resistance of at least about 125 g/mil and a transverse directional tear resistance of at least about 500 g/mil, and whereby said stretch wrap film is stretched during the wrapping step.

45. The method of claim 44 wherein said outer high cling layer is chosen from the group consisting of an ethylene-acrylatepolymer and a very low density polyethylene.

46. The method of claim 45 wherein said very low density polyethylene has a density of form about 0.88 g/cm$^3$ to about 0.910 g/cm$^3$.

47. The method of claim 44 wherein said slip layer is chosen from the group consisting of polyethylene, polypropylene and combinations thereof.

48. A method for stretch wrapping an item, comprising wrapping the item with a multilayer, thermoplastic stretch wrap film containing at least three polymeric film layers, said stretch wrap film comprising:

(a) a first polymeric cling layer;

(b) a second polymeric cling layer; and (c) at least one inner polymeric layer, located between said first polymeric cling layer and said second polymeric cling layer, comprising a polyethylene copolymer or polyethylene terpolymer, wherein at least one of said inner polymeric layers comprises at least about 60 weight percent of the polyethylene copolymer or the terpolymer, said polyethylene copolymer or said terpolymer having a polydispersity of from about 1 to about 4, a melt index ($I_2$) of from about 0.5 to about 10 g/10 min., and a melt flow ratio ($I_{20}/I_2$) of from about 12 to about 22;

wherein said stretch wrap film comprises from about 5 wt. % to about 40 wt. % of the total amount of said inner polymeric layer(s);

so as to produce a stretch wrap film having a maximum stretch of at least 340%, an F-50 dart drop value of at least about 130 g/mil as determined by ASTM D1709, a machine directional tear resistance of at least about 125 g/mil and a transverse directional tear resistance of at least about 500 g/mil, and whereby said stretch wrap film is stretched during the wrapping step.

49. The method of claim 48 wherein the first polymeric cling layer and said second polymeric cling layer comprise two or more monomers, wherein the first monomer is ethylene, in a major amount by weight, and the second monomer is an alpha olefin of from about 3 to about 12 carbon atoms, in a minor amount by weight.

50. The method of claim 48 wherein at least one of said first polymeric cling layer and said second polymeric cling layer has a cling force to the other layer of at least about 140 grams/inch as determined by ASTM D5458-94.

51. The method of claim 50 wherein at least one of said first polymeric cling layer and said second polymeric cling layer has a cling force to the other layer of at least about 220 grams/inch.

52. The method of claim 48 wherein said stretch wrap film comprises from about 5 wt. % to about 30 wt. % of the total amount of said inner polymeric layer(s).

53. The method of claim 52 wherein said stretch wrap film comprises from about 10 wt. % to about 20 wt. % of the total amount of said inner polymeric layer(s).

54. The method of claim 48 wherein said polydispersity is in the range of from about 1.5 to about 4.

55. The method of claim 48 wherein the density of said polyethylene copolymer or terpolymer is in the range of from about 0.88 to about 0.93 g/cm$^3$.

56. The method of claim 48 wherein the melt index of said polyethylene copolymer or terpolymer is in the range of about 0.5 to about 2 g/10 min.

57. The method of claim 48 wherein the melt flow ratio of said polyethylene copolymer or terpolymer is in the range of from about 14 to about 20.

58. The method of claim 48 wherein said polyethylene copolymer or terpolymer is made with a metallocene catalyst.

59. The method of claim 48 wherein the F-50 dart drop value is at least about 150 g/mil.

60. The method of claim 48 wherein the transverse direction tear resistance is at least about 600 g/mil.

61. The method of claim 48 wherein the machine direction tear resistance is at least about 175 g/mil.

62. The method of claim 49 wherein the second monomer of said first polymeric cling layer and said second polymeric cling layer are independently selected from the group consisting of propylene, 1-butene, 1-pentene, 1-hexene, 3-methyl-1-pentene, 4-methyl-1-pentene, 1-octene, 1-decene, and 1-dodecene.

63. The method of claim 48 wherein said stretch wrap film has a stress level at 200% elongation of at least 1400 psi.

64. The method of claim 48 wherein said stretch wrap film has a stress level at 250% elongation of at least 1450 psi.

65. A method for stretch wrapping an item, comprising wrapping the item with a multilayer, thermoplastic stretch wrap film containing at least three polymeric film layers, said stretch wrap film comprising:

(a) a first layer comprising a linear low density polyethylene resin, said linear low density polyethylene resin having a density from about 0.89 to about 0.94 g/cm$^3$ and having a melt index ($I_2$) of from about 1 to about 10 g/10 min., said linear low density polyethylene resin containing from about 2 to about 8 weight percent n-hexane extractables;

(b) a second layer comprising a linear low density polyethylene resin, said linear low density polyethylene resin having a density from about 0.89 to about 0.94 g/cm$^3$ and having a melt index ($I_2$) of from about 1 to about 10 g/10 min., said linear low density polyethylene resin containing from about 2 to about 8 weight percent n-hexane extractables, at least one of said first layer and said second layer has sufficient cling resulting from inherent cling alone, cling additives or a combination thereof so as to produce a cling force to the other layer of at least about 140 grams/inch as determined by ASTM D5458-94; and (c) at least one inner polymeric layer, located between the first layer and said second layer, comprising a polyethylene copolymer or polyethylene terpolymer, wherein at least one of said inner polymeric layers comprises at least about 60 weight percent of the polyethylene copolymer or the terpolymer, said polyethylene copolymer or terpolymer having a polydispersity of from about 1 to about 4, a melt index ($I_2$) of from about 0.5 to about 10 g/10 min., and a melt flow ratio ($I_{20}/I_2$) of from about 12 to about 22;

wherein said stretch wrap film comprises from about 5 wt. % to about 40 wt. % of the total amount of said inner polymeric layer(s);

so as to produce a stretch wrap film having a maximum stretch of at least 340%, an F-50 dart drop value of at least about 130 g/mil as determined by ASTM D1709, a machine directional tear resistance of at least about 125 g/mil and a transverse directional tear resistance of at least about 500 g/mil, and whereby said stretch wrap film is stretched during the wrapping step.

66. The stretch wrap film of claim 1 wherein said inherent cling is partially from n-hexane extractables.

67. The method of claim 1 wherein said cling force is partially from at least one cling additive.

68. The method of claim 67 wherein said cling additive is poly-isobutylene.

69. The method of claim 1 wherein said first layer and said second layer are independently selected from the group consisting of linear low density polyethylene, very low density polyethylene, high pressure low density polyethylene, ethylene-acrylate polymers and mixtures thereof.

70. The method of claim 41 wherein said inherent cling is partially from n-hexane extractables.

71. The method of claim 41 wherein said cling force is partially from at least one cling additive.

72. The method of claim 44 wherein said inherent cling is partially from n-hexane extractables.

73. The method of claim 44 wherein said cling force is partially from at least one cling additive.

74. The method of claim 48 wherein said inherent cling is partially from n-hexane extractables.

75. The method of claim 48 wherein said cling force is partially from at least one cling additive.

76. The method of claim 75 wherein said cling additive is poly-isobutylene.

77. The method of claim 48 wherein said first polymeric cling layer and said second polymeric cling layer are made from olefin polymer resins.

78. The method of claim 77 wherein at least one of said olefin polymer resins is a copolymer, said copolymer comprising an olefin monomer with a second monomer.

79. The method of claim 78 wherein said olefin polymer resin is an ethylene-acrylate polymer, said ethylene-acrylate polymer being selected from the group consisting of methyl, ethyl, and n-butyl acrylate.

80. The method of claim 48 wherein said first polymeric cling layer and said second polymeric cling layer are independently selected from the group consisting of linear low density polyethylene, very low density polyethylene, high pressure low density polyethylene, ethylene-acrylate polymers and mixtures thereof.

81. The method of claim 80 wherein the acrylate of said ethylene-acrylate polymers is selected from the group consisting of methyl, ethyl and n-butyl acrylate.

82. The method of claim 48 wherein the stretch wrap film has a maximum stretch of at least about 360%.

83. The method of claim 82 wherein the stretch wrap film has a maximum stretch of at least about 380%.

* * * * *

UNITED STATES PATENT AND TRADEMARK OFFICE
CERTIFICATE OF CORRECTION

PATENT NO.: 5,907,942
DATED: June 1, 1999
INVENTOR(S): Eichbauer

It is certified that errors appear in the above-identified patent, and that said Letters Patent is hereby corrected as shown below.

Column 13, Claim 12, line 66, delete "polydispersitypolymer" and insert --polydispersity polymer--

Column 14, Claim 35, line 58, delete "acrylatepolymer" and insert --acrylate polymer--

Column 14, Claim 36, line 60, delete "form" and insert --from--

Column 15, Claim 42, line 44, delete "acrylatepolymer" and insert --acrylate polymer--

Column 16, Claim 45, line 17, delete "acrylatepolymer" and insert --acrylate polymer--

Column 16, Claim 46, line 19, delete "form" and insert --from--

Signed and Sealed this

Fourteenth Day of December, 1999

Attest:

*Attesting Officer*

Q. TODD DICKINSON

*Acting Commissioner of Patents and Trademarks*